July 4, 1939.  H. E. HODGSON  2,164,521
ELECTROMAGNETIC BRAKE
Filed Nov. 18, 1937  2 Sheets-Sheet 1
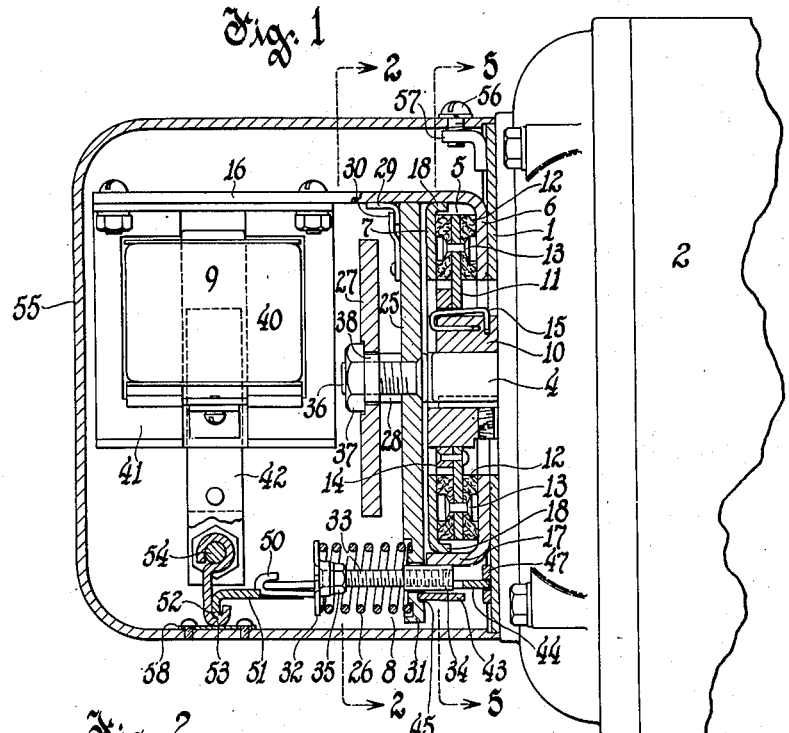
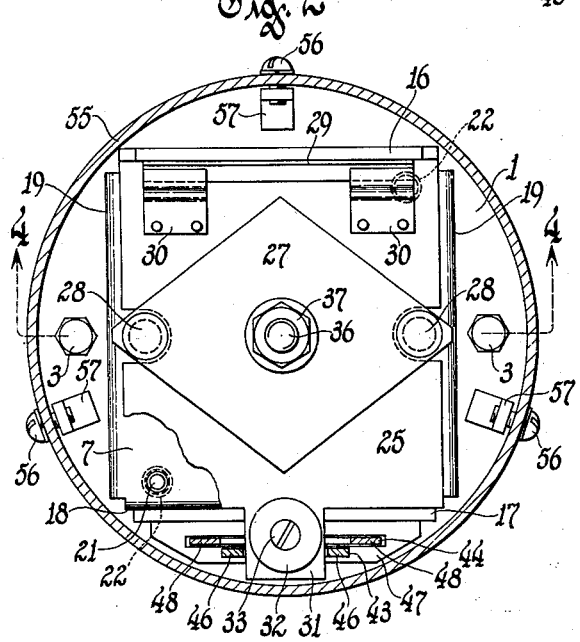
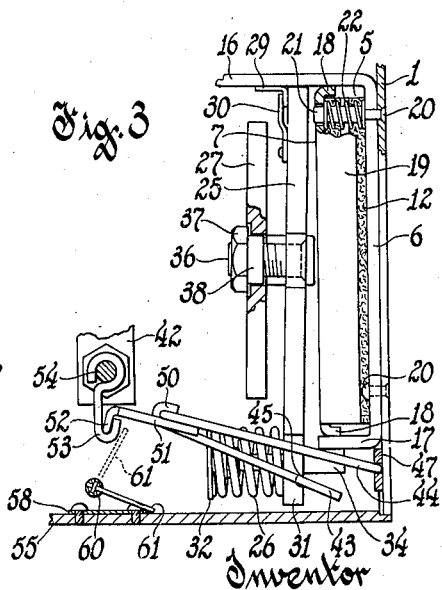
Inventor
Howard E. Hodgson
By Frank H. Hubbard
Attorney July 4, 1939.  H. E. HODGSON  2,164,521
ELECTROMAGNETIC BRAKE
Filed Nov. 18, 1937   2 Sheets-Sheet 2
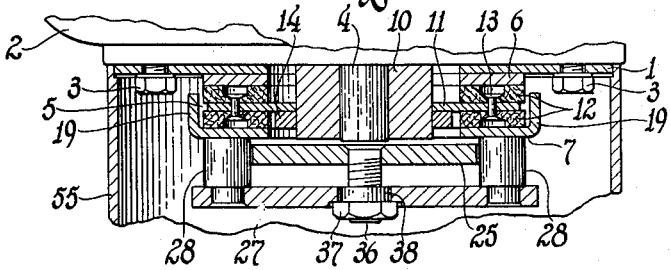
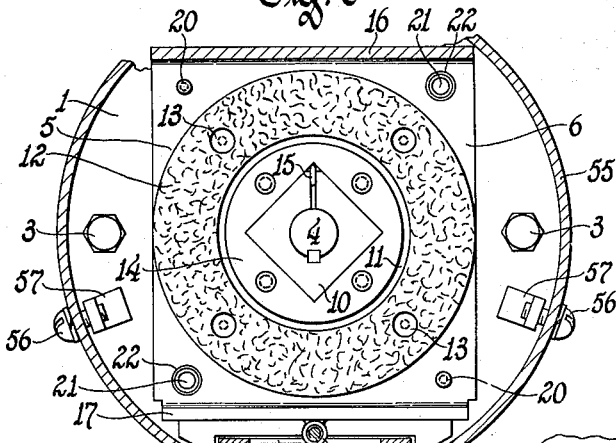
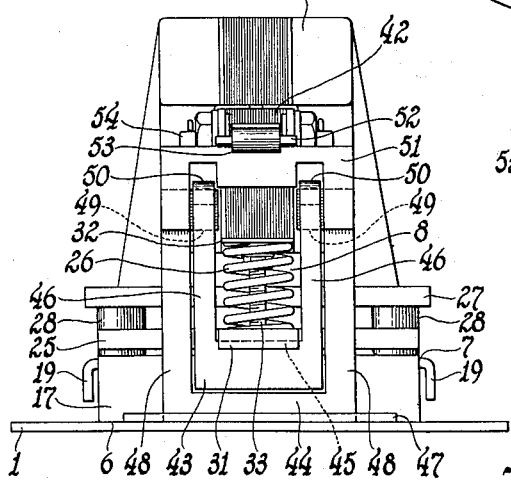
Inventor
Howard E. Hodgson
By Frank H. Hubbard
Attorney Patented July 4, 1939

2,164,521

UNITED STATES PATENT OFFICE 2,164,521

ELECTROMAGNETIC BRAKE

Howard E. Hodgson, Wauwatosa, Wis., assignor to Cutler-Hammer, Inc., Milwaukee, Wis., a corporation of Delaware Application November 18, 1937, Serial No. 175,225

9 Claims. (Cl. 188—171)

This invention relates to electromagnetic brakes, and more particularly to disk type brakes for use in connection with electric motors.

The invention has among its objects to simplify and generally improve the construction and operation of brakes of the aforesaid type.

Another object is to provide a compact brake of the aforesaid type having an improved solenoid operated releasing mechanism associated therewith.

Another object is to provide a solenoid operated brake which is economical to manufacture, easy to adjust and which is capable of withstanding long and severe service without undue wear on any of its operating parts.

Various other objects and advantages of the invention will hereinafter appear.

The accompanying drawings illustrate an embodiment of the invention which will now be described, it being understood that various modifications may be made in the embodiment illustrated without departing from the spirit and scope of the appended claims.

In the drawings,

Figure 1 is a vertical sectional view of a disk type brake embodying the invention;

Fig. 2 is a sectional view taken substantially on line 2—2 of Fig. 1;

Fig. 3 is a fragmentary side elevational view of certain of the parts shown in Fig. 1, illustrating the same in released position;

Fig. 4 is a sectional view on line 4—4 of Fig. 2;

Fig. 5 is a sectional view on line 5—5 of Fig. 1;

Fig. 6 is a bottom view of the brake mechanism illustrated in Fig. 1 with the cover removed;

Fig. 7 is a fragmentary sectional view illustrating a manual releasing mechanism for the brake, and Fig. 8 is a side elevational view of the manual releasing mechanism shown in Fig. 7.

The brake illustrated in Fig. 1 is carried by a circular adapter plate 1 which is designed for mounting upon the end housing of a conventional electric motor 2. Adapter plate 1 is secured to the end housing of motor 2 by screws 3 shown in Figs. 2, 4 and 5, and the same is provided with a center opening for receiving the shaft 4 of said motor. The brake includes a friction element 5 mounted upon the motor shaft 4 to rotate therewith, and a pair of non-rotatable friction plates 6 and 7 which are rectangular in shape and are arranged on opposite sides of element 5. Friction plate 6 is fixed to adapter plate 1 and friction plate 7 is slidably mounted upon friction plate 6 and is biased to clamp friction element 5 between the same and friction plate 6 by a spring pressure mechanism 8. A brake release solenoid 9 is provided for relieving friction plate 7 from the biasing action of spring pressure mechanism 8.

More specifically friction element 5 includes a square hub 10 keyed to the motor shaft 4 and a circular disk 11 slidably mounted upon said hub and having annular friction linings 12 secured to opposite faces thereof by rivets 13. Disk 11 has a bearing member 14 riveted to the front face thereof which is provided with a square opening for receiving hub 10 and said disk is yieldingly held against said hub by a U-shaped spring clip 15. Clip 15 is mounted upon one of the corners of hub 10 and one leg thereof is held within a drilled opening in the front face of hub 10 while the other leg thereof engages within the opening in disk 11 and bearing plate 14 and is provided with an inwardly bent portion which is held within a drilled opening in the outer surface of said hub.

Friction plates 6 and 7 are each provided with an opening for receiving hub 10, and friction plate 6 comprises a sheet metal stamping having a horizontally arranged forwardly extending arm 16 on the upper side thereof and a horizontally arranged forwardly extending projection 17 on the under side thereof. Friction plate 7 also comprises a sheet metal stamping and the same is stiffened by horizontally arranged upper and lower projections 18—18 and vertically arranged side projections 19—19. Projections 18—18 have a sliding fit between arms 16 and projection 17 on friction plate 6 and the projections 19—19 form with arm 16 and projection 17 a substantially complete enclosure for the friction element 5. Friction plate 6 is secured to adapter plate 1 by rivets 20 (Figs. 2, 3 and 5) which are located at the corners of said plate and two of the rivets which are diagonally disposed on said plate are provided with pin projections 21 which extend into openings in friction plate 7 to hold the latter against lateral movement. As shown in Figs. 3 and 5 the pin projections 21 carry springs 22 which are held under compression between friction plates 6 and 7.

The spring pressure mechanism 8 includes a lever 25 having a brake setting spring 26 associated therewith, and a thrust plate 27 having a pair of thrust pins 28—28 mounted thereon for engaging the front face of friction plate 7. Lever 25 comprises a square sheet metal stamping having its upper end fulcrumed upon an angle member 29 which is located in front of said lever and is welded to the under face of arm 16. Lever 25 is held in engagement with angle member 29 by a pair of fingers 30 which are riveted to the front face of said lever and the lower end of said lever is provided with a downwardly extending projection 31. Spring 26 engages the front face of projection 31 and is held under compression by a washer 32 carried by an adjusting screw 33. The rear end of screw 33 has an elongated nut 34 associated therewith which is located within an opening in projection 31 and welded to the underside of projection 17 on friction plate 6, and washer 32 is clamped against a slotted head on the front end of screw 33 by a nut 35. As is apparent, screw 33 is adjustable within the nut 34 to vary the degree of compression of spring 26. Thrust plate 27 is spaced with respect to the front face of lever 25 and is adjustably connected to said lever by a screw 36 and a lock nut 37 which are arranged in line with the axis of shaft 4. Screw 36 extends into an opening in lever 25 and has its inner end welded to said lever and nut 37 engages the front face of thrust plate 27 and is provided with a cylindrical shank 38 which is rotatable within an opening in said plate. Lever 25 is recessed on opposite sides as shown in Fig. 2 to receive the thrust pins 28—28 and said pins are riveted within openings in thrust plate 27 as shown in Fig. 4. Spring 26 thus acts through the medium of lever 25, thrust plate 27 and thrust pins 28 to bias friction plate 7 inwardly to thereby provide for setting of the brake by clamping of friction element 5 between friction plates 6 and 7. The brake can be readily adjusted to compensate for wear of the friction linings by adjusting nut 37 in a direction to move lever 25 toward thrust plate 27.

The brake release solenoid 9 includes a solenoid winding 40 carried by magnet frame 41 secured to the under side of arm 16 on friction plate 6 and a vertically arranged plunger 42 which is normally held by gravity in the position shown in Fig. 1. The lower end of plunger 42 is operatively connected to lever 25 through the medium of a toggle mechanism including a link 43 and a lever 44 each of which comprises a sheet metal stamping. Link 43 is fulcrumed within a recess 45 in the rear face of projection 31 on lever 25 and the same is provided with forwardly extending side arms 46—46 which straddle said projection. Adapter plate 1 has a member 47 welded to the front face thereof which is provided with a slot for receiving the rear end of lever 44 and said lever is provided with forwardly extending side arms 48—48 which straddle the side arms 46 on link 43. Each of the side arms 48 has an inwardly extending projection 49 on the front end thereof (Fig. 6) and the side arms 46—46 of link 43 are provided with hooked end portions 50 for engaging the front edges of said projections. Lever 44 has a cross piece 51 welded thereto which extends between the front ends of side arms 48 and said cross piece is provided with a downwardly extending projection 52 which engages a hooked link 53 carried by a pin 54 fixed to the lower end of plunger 42.

Plunger 42 and lever 44 are normally positioned as shown in Fig. 1 to permit setting of the brake under the action of spring 26. Upon energization of solenoid winding 40 plunger 42 moves upwardly into its attracted position and link 43 and lever 44 then operate as shown in Fig. 3 to move lever 25 forwardly against the action of spring 26. Friction plate 7 is thus relieved from the biasing action of spring 26 and the same is moved forwardly under the action of springs 22 to release friction element 5. Upon deenergization of solenoid winding 40 plunger 42 drops under the action of gravity into the position shown in Fig. 1 and lever 44, link 43 and lever 25 are returned to the position shown in this figure under the action of spring 26 to provide for resetting of the brake.

The brake is provided with a circular cover 55 which is bored to receive adapter plate 1. Cover 55 is secured to adapter plate 1 by screws 56 which are threaded into lugs 57 welded to the front face of said adapter plate and said cover carries a stop plate 58 to be engaged by link 53 when solenoid 9 is deenergized.

As shown in Figs. 7 and 8 cover 55 carries a manual releasing mechanism comprising a horizontally arranged shaft 60 carried by said cover and having an arm 61 fixed to the inner end thereof which is arranged to cooperate with the under face of cross piece 51 on lever 44 and an operating handle 62 fixed to the outer end thereof. Shaft 60 is rotatable within an elongated bearing member 63 fixed within an opening in the cover 55 by a welded connection 64 and the handle 62 is movable between the full and dotted line positions illustrated in Fig. 8 and is normally held by gravity in the latter position. When handle 62 is in the dotted line position shown in Fig. 8 arm 61 clears the lower face of cross piece 51 on lever 44. However, upon movement of handle 62 into its full line position, (Fig. 8) arm 61 engages cross piece 51 on lever 44 to move said lever upwardly into a position wherein the brake is released. The manual releasing mechanism is held in brake releasing position by frictional engagement of arm 61 with cross piece 51. Upon energization of solenoid winding 40 lever 44 and its associated cross piece 51 are moved slightly upwardly with respect to arm 61 and the operating handle 62 then drops by gravity into the dotted line position shown in Fig. 8 to permit setting of the brake upon deenergization of said winding. It is, of course, apparent that the operating handle can be returned to its dotted line position at any time to permit resetting of the brake.

What I claim as new and desire to secure by Letters Patent is:

1. An electromagnetic brake comprising a rotatable braking element, a pair of non-rotatable braking elements arranged on opposite sides of said former element, one of said non-rotatable braking elements being fixed and the other being movable toward and away from said fixed braking element, a pivoted lever arranged to one side of said braking elements, a pressure plate adjustably mounted upon said lever and having thrust parts associated therewith for engaging said last mentioned non-rotatable braking element to move the same toward said first mentioned non-rotatable braking element, a spring associated with said lever for biasing the same in a direction to effect engagement of said braking elements, and an operating solenoid for moving said lever against the action of said spring for release of said braking element.

2. An electromagnetic brake comprising a rotatable braking element, a pair of non-rotatable braking elements arranged on opposite sides of said former braking element, one of said non-rotatable braking elements being fixed and having a projecting arm on one side thereof, and the other being movable toward and away from said fixed braking element, a lever arranged to one side of said element and pivotally mounted upon said arm, a pressure plate adjustably mounted upon said lever and having thrust parts associated therewith for engaging said last mentioned non-rotatable element to clamp said rotatable braking element between said non-rotatable braking elements, a brake setting spring associated with the free end of said lever, and an operating solenoid mounted upon said arm and operatively connected to said lever to move the same into brake releasing position against the action of said spring.

3. An electromagnetic brake for motor mounting comprising a stationary braking element for securement to the motor casing, a non-rotatable braking element slidably mounted upon said stationary braking element, a rotatable braking member located between said braking elements and arranged for mounting upon the motor shaft, a spring biased brake setting mechanism carried by said first mentioned braking element and associated with said nonrotatable braking element to bias the same in a direction to effect frictional engagement of said braking elements with said rotatable braking member, a brake releasing solenoid carried by said stationary braking element and a toggle mechanism operatively connecting said solenoid to said brake setting mechanism.

4. An electromagnetic brake for motor mounting comprising a stationary braking element for securement to the motor casing, a non-rotatable braking element slidably mounted upon said stationary braking element, a rotatable braking member located between said braking elements and arranged for mounting upon the motor shaft, a spring biased brake setting mechanism carried by said stationary braking element and associated with said non-rotatable braking element to bias the same in a direction to effect frictional engagement of said braking elements with said braking member, a brake releasing solenoid carried by said first mentioned braking element, and a toggle mechanism operatively connecting said solenoid to said brake setting mechanism, said toggle mechanism including a lever having one end pivotally mounted upon said stationary braking element and its opposite end operatively connected to said solenoid, and a link having one end operatively connected to said brake setting mechanism and its opposite end pivotally connected to said lever at a point removed from the pivot thereof.

5. An electromagnetic brake for motor mounting comprising a vertically arranged stationary braking element for securement to the motor casing, a vertically arranged non-rotatable braking element slidably mounted upon said stationary braking element, a rotatable braking member located between said braking elements and arranged for mounting upon the motor shaft, a spring biased brake setting mechanism carried by said stationary braking element and associated with said non-rotatable braking element to bias the same in a direction to effect clamping of said braking member between said braking elements, a brake releasing solenoid carried by said stationary braking element and located substantially within the vertical space required by said braking elements, a toggle mechanism operatively connecting said solenoid to said brake setting mechanism and a cover closely surrounding the aforementioned parts and removably secured to said stationary braking element.

6. An electromagnetic brake for motor mounting comprising a vertically arranged stationary braking element for mounting upon the motor casing, said braking element having a forwardly projecting arm on the upper side thereof, a vertically arranged non-rotatable braking element slidably mounted upon said stationary braking element, a rotatable braking member located between said braking elements and arranged for mounting upon the motor shaft, a spring biased brake setting lever pivotally mounted upon said arm and associated with said non-rotatable braking element to bias the same in a direction to effect clamping of said rotatable braking member between said braking elements, a toggle mechanism for moving said brake releasing lever into brake releasing position and a brake releasing solenoid including a magnet fixed to the under side of said arm and a plunger operatively connected to said brake releasing lever through the medium of said toggle mechanism.

7. An electromagnetic brake comprising cooperating rotatable and non-rotatable braking members having a brake setting spring associated therewith, a fixed support carrying said non-rotatable braking elements and a brake releasing mechanism carried by said support including a lever having one end pivotally mounted upon said support and a link having one end pivotally connected to said lever at a point removed from the pivot thereof and its opposite end operatively connected to said brake setting spring.

8. An electromagnetic brake comprising rotatable and non-rotatable braking elements having a spring biased brake setting member associated therewith, a fixed support for said non-rotatable braking elements and an electromagnetically operated brake releasing mechanism carried by said support including a solenoid mounted upon said support, a lever having one end pivotally mounted upon said support and its opposite end operatively connected to said solenoid and a link having one end pivotally connected to said lever at a point removed from the pivot thereof and its opposite end pivotally connected to said brake setting member.

9. An electromagnetic brake comprising rotatable and non-rotatable braking elements having a spring biased brake setting member associated therewith, a fixed support for said non-rotatable braking elements and an electromagnetically operated brake releasing mechanism carried by said support including a solenoid mounted upon said support, a lever having one end pivotally mounted upon said support and its opposite end operatively connected to said solenoid, and a link having one end pivotally connected to said lever at a point removed from the pivot thereof and its opposite end pivotally connected to said brake setting member, said brake setting member being located intermediate the ends of said lever.

HOWARD E. HODGSON.